(12) United States Patent
Geen et al.

(10) Patent No.: US 7,980,133 B2
(45) Date of Patent: Jul. 19, 2011

(54) METHOD AND APPARATUS FOR A MICROMACHINED MULTISENSOR

(75) Inventors: John A. Geen, Tewksbury, MA (US); Jinbo Kuang, Acton, MA (US); Vineet Kumar, Wakefield, MA (US)

(73) Assignee: Analog Devices, Inc., Norwood, MA (US)

( * ) Notice: Subject to any disclaimer, the term of this patent is extended or adjusted under 35 U.S.C. 154(b) by 561 days.

(21) Appl. No.: 12/194,288

(22) Filed: Aug. 19, 2008

(65) Prior Publication Data

US 2010/0043551 A1    Feb. 25, 2010

(51) Int. Cl.
*G01P 9/04* (2006.01)
(52) U.S. Cl. .................... 73/504.04; 73/504.12
(58) Field of Classification Search .......... 73/504.04, 73/504.12, 514.32; 324/658
See application file for complete search history.

(56) References Cited

U.S. PATENT DOCUMENTS

| | | | |
|---|---|---|---|
| 5,025,346 A | 6/1991 | Tang et al. | 361/283 |
| 5,392,650 A | 2/1995 | O'Brien et al. | 73/517 A |
| 5,712,426 A | 1/1998 | Sapuppo et al. | 73/504.03 |
| 5,869,760 A | 2/1999 | Geen | 73/504.12 |
| 6,767,758 B1 | 7/2004 | Geen | 438/48 |
| 6,837,107 B2 | 1/2005 | Geen | 73/504.04 |
| 6,845,665 B2 | 1/2005 | Geen | 73/504.04 |
| 7,347,094 B2 | 3/2008 | Geen et al. | 73/504.12 |
| 2005/0229703 A1 | 10/2005 | Geen et al. | 73/510 |
| 2005/0229705 A1 | 10/2005 | Geen | 73/514.16 |
| 2006/0230830 A1 | 10/2006 | Geen et al. | 73/514.29 |

*Primary Examiner* — John E Chapman
(74) *Attorney, Agent, or Firm* — Sunstein Kann Murphy & Timbers LLP (57) ABSTRACT

In a micromachined devices having a movable shuttle driven in oscillation, measuring the electrical charge accumulated on opposing drive capacitors to determine the displacement of the movable shuttle. Alternately, in such a micromachined device, measuring the electrical charge accumulated on a drive capacitor and comparing the measured electrical charge to a nominal electrical charge to determine the displacement of the movable shuttle.

18 Claims, 11 Drawing Sheets

METHOD AND APPARATUS FOR A MICROMACHINED MULTISENSOR

FIELD OF THE INVENTION

The invention generally relates to micromachined devices and, more particularly, the invention relates to multisensor micromachined devices.

BACKGROUND OF THE INVENTION

Some MEMS devices can sense both linear acceleration and angular rate. Such sensors, which are a type of "multisensor," typically sense displacement of a mass using sensing capacitors.

One such MEMS multisensor is described in U.S. Pat. No. 6,845,665 entitled "Micro-Machined Multi-Sensor Providing 2-Axes of Acceleration Sensing and 1-Axis of Angular Rate Sensing." The multisensor in that patent includes a rigid frame anchored to a substrate, and a pair of a proof masses (or "shuttles") suspended from the rigid frame by a plurality of flexures. The shuttles may be vibrated along one axis, and Coriolis acceleration may cause the shuttles to be displaced along another axis. Vibration of the shuttles is typically forced by drive capacitors that are driven by alternating voltages to create electrostatic drive forces, while the displacement of the frame is sensed by separate sensing capacitors. The device detects linear acceleration by sensing the displacement of the frame in two axes, and senses Coriolis acceleration by sensing the rotation of the frame about a perpendicular axis. Therefore, the multisensor detects both linear acceleration and (because the Coriolis acceleration is a function of the rotation of the multisensor) rotation.

Some sensors, such as some gyroscopes, include two accelerometers vibrating in antiphase, so that the responses to Coriolis acceleration are in antiphase, and the responses to linear acceleration are in-phase. In such a sensor, Coriolis acceleration sensing can be improved by mechanically coupling the two accelerometers so that the structure provides little resistance to antiphase vibration, but substantial resistance to in-phase motion. U.S. Pat. No. 7,347,094, entitled "Coupling Apparatus for Inertial Sensors" describes fork members configured to couple two masses.

However, because a linear acceleration along at least one axis would cause both accelerometers to displace in the same direction (that is, in-phase), a sensor with a dampened in-phase response would have diminished linear acceleration sensing capacity.

SUMMARY OF THE INVENTION

In accordance with one embodiment of the invention, one method of measuring the displacement of a movable shuttle is to measure the charge on the drive capacitors. If a shuttle is nominally centered between two drive capacitors, then the two drive capacitors will be at a nominal (possibly equal) value, and at a given voltage the two capacitors will each draw and accumulate a nominal charge from their respective driving voltages. However, when such a shuttle is displaced (by a linear acceleration, for example) it will no longer be centered between the two drive capacitors. In that case, the capacitance of the drive capacitors will change, and therefore the amount of charge required to charge the drive capacitors will increase or decrease according to the displacement. The quantity of charge on a drive capacitor of a displaced shuttle, relative to the quantity of charge required to charge the drive capacitor when the shuttle is in its nominal position, can be used to determine the displacement of the shuttle. Alternately, the difference in charge between two drive capacitors can be used to determine the displacement of the shuttle.

BRIEF DESCRIPTION OF THE DRAWINGS

The foregoing advantages of the invention will be appreciated more fully from the following further description thereof with reference to the accompanying drawings wherein.

DESCRIPTION OF ILLUSTRATIVE EMBODIMENTS

Figure 1:
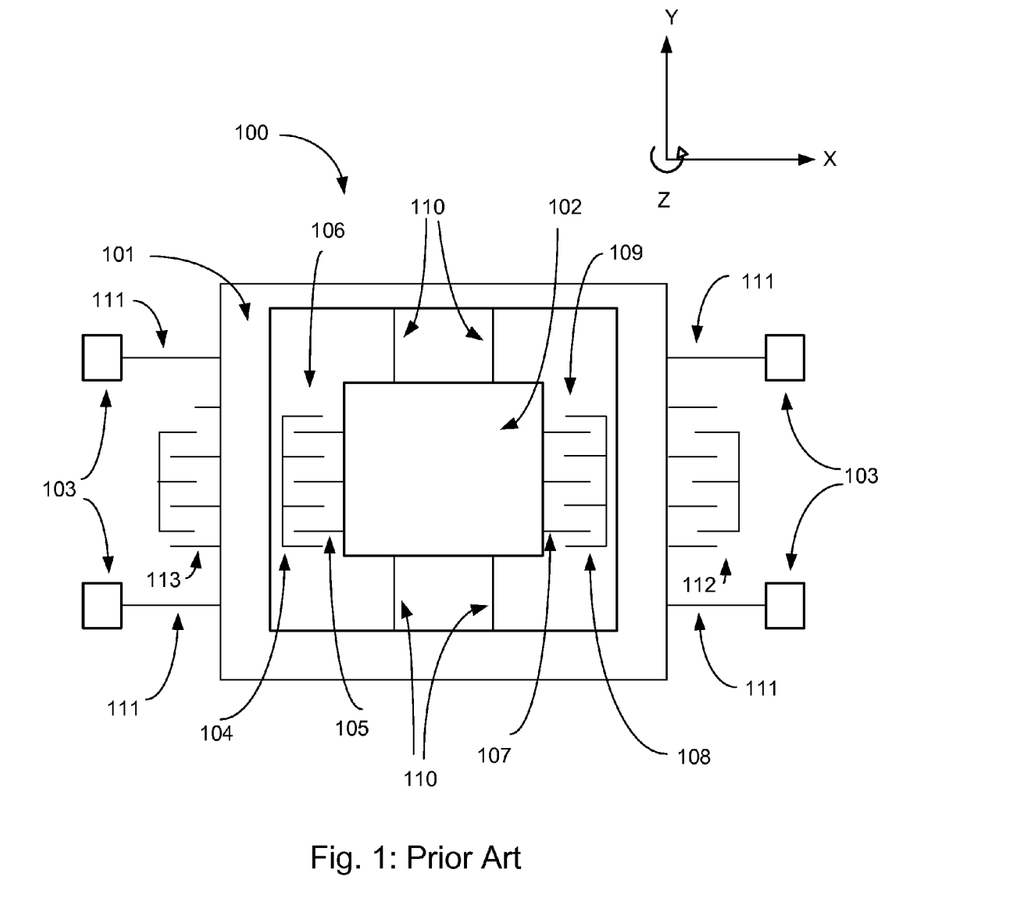
FIG. 1 schematically illustrates a prior art accelerometer with a shuttle suspended in an outer frame.

A prior art MEMS gyroscope 100, which is schematically shown in FIG. 1, includes a shuttle 102 flexibly suspended from (and internal to) a frame 101 by flexures 110. The frame 101, in turn, is flexibly suspended from outer fixed points 103 by flexures 111. The shuttle 102 and the frame 101 are substantially in the same plane. A set of fixed fingers 104 stand on, but are electrically isolated from, the substrate. The fixed fingers 104 extend in the direction of, and in the same plane as, the shuttle 102. A corresponding set of shuttle fingers 105 extend from the shuttle and mesh with the fixed fingers 104 to form comb drive capacitor 106. The shuttle fingers 105 are grounded, while fixed fingers 104 are driven with a periodic signal (for example, a square wave) that causes a voltage difference between the fixed fingers 104 and the shuttle fingers 105. This voltage difference produces an electrostatic force acting on the shuttle according to the following equation:

$$Force = \epsilon NbV^2/d$$

where:
  (i) $\epsilon$ is the permittivity of the space between the fingers, and is a physical constant depending on the material between the fingers;
  (ii) N is the number of fingers;
  (iii) b is the effective thickness of the structural layer;
  (iv) V is the voltage difference between the fingers; and
  (v) d is the distance between the fingers.

Because the drive signal is periodic, the electrostatic force is also periodic.

Another set of shuttle fingers 107 and fixed fingers 108 form a second comb drive capacitor 109 on the opposing side of the shuttle, and are driven by a periodic signal the same as, but 180 degrees out of phase with, the signal driving comb drive capacitor 106, to supply an electrostatic force 180 degrees out of phase with that of the first comb drive capacitor 106. Applications of these alternating forces results in a periodic vibration of the shuttle 102 along the X-axis and within the frame 101.

As is known in the art, if the frame 101 and its vibrating shuttle 102 are subject to a rotation about an axis perpendicular to the plane of the frame 101 and the shuttle 102, then Coriolis acceleration will cause the frame to move along an axis in the plane, perpendicular to the axis of vibration of the shuttle. This Coriolis acceleration can be detected with an accelerometer, and the acceleration information can be processed to yield information about the rotation. In FIG. 1, the shuttle 102 vibrates along the X-axis (in the plane of the page), and the rotation axis is parallel to the Z-axis (normal to the page). Rotation of the accelerometer about a point in the Z-axis when the shuttle 102 is vibrating will cause the frame 101 to move along the Y-axis (in the plane of the page, and perpendicular to the X-axis). The motion of the frame is detected using sense capacitors 112 and 113. The drive capacitors 106 and 109 are independent of the sense capacitors 112 and 113, and the prior art drive capacitors 106 and 109 are not used to sense displacement of the shuttle 102 in response to linear acceleration.

Figure 2A:
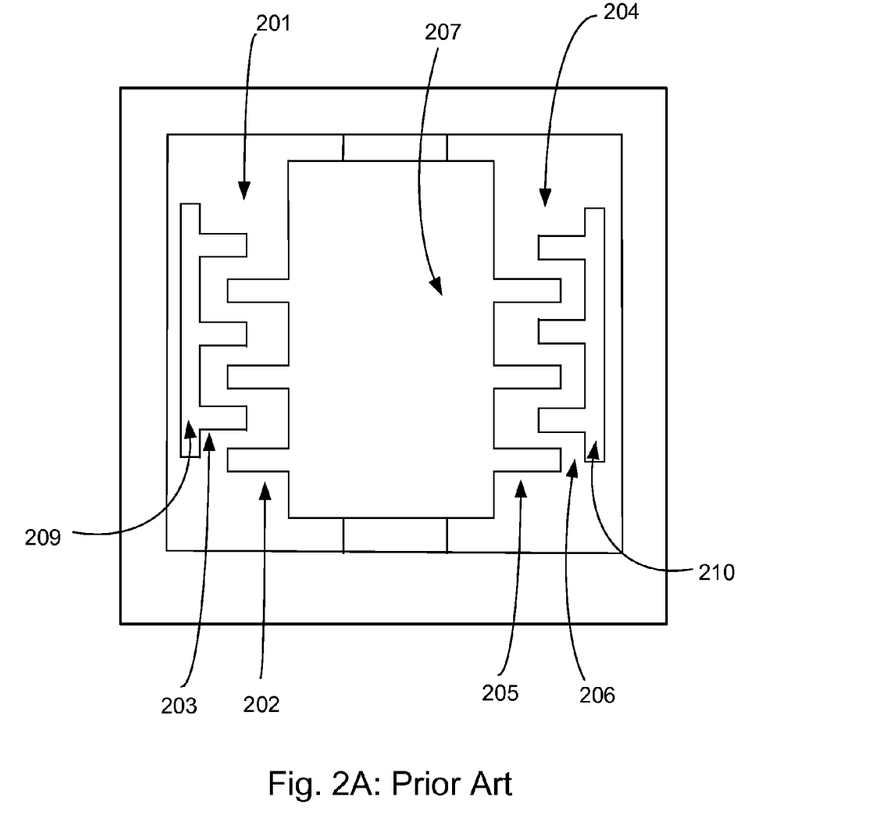
FIG. 2A schematically illustrates the drive combs of a prior art accelerometer according to FIG. 1.
Figure 2B:
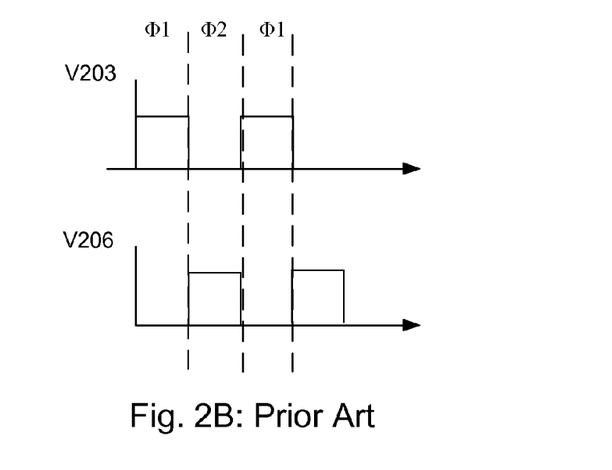
FIG. 2B shows illustrative drive signals for the drive combs of FIG. 2A.

The comb drive capacitors of a prior art accelerometer according to FIG. 1 are alternately illustrated in FIG. 2A, and FIG. 2B shows illustrative drive signals for the comb drive capacitors of FIG. 2A.

There are two comb drive capacitors 201 and 204 shown in FIG. 2A. The first comb drive capacitor 201 is formed by shuttle fingers 202, which are intermeshed with fixed fingers 203 when the shuttle is centered in its nominal position (as shown). Similarly, the second comb drive capacitor 204 is formed by shuttle fingers 205 and fixed fingers 206. The fixed fingers 203 and 206 stand on, but are electrically isolated from, the substrate. The fixed fingers 203 are supported from the substrate (not shown) by fixed finger mesa 209, and the fixed fingers 206 are supported from the substrate by fixed finger mesa 210. The fixed fingers 203 and 206 extend in the direction of, and in the same plane as, the shuttle 207.

If the shuttle 207 is held at ground potential, and if the fixed fingers 203 and 206 are driven with out-of-phase square waves (see the illustrative signals in FIG. 2B, for example), each with a peak voltage that is higher than the ground, and a low voltage that is at ground potential, then each of the comb drive capacitors 201 and 204 will charge when its driving square wave is high, and discharge its driving square wave is low. Illustratively, a quantity of electrical charge will flow into the comb drive capacitor 201 in the first half of the cycle ($\Phi$1) of the drive signal, and out of the comb drive capacitor 201 in the second half of the cycle ($\Phi$2) of the drive signal. Similarly, in this illustration, a quantity of electrical charge will flow into the comb drive capacitor 204 in the second half of the cycle ($\Phi$2) of the drive signal, and out of the comb drive capacitor 204 in the first half of the cycle ($\Phi$1) of the drive signal. When the shuttle 207 is centered, the two comb drive capacitors 201 and 204 are nominally equal, so that the charge that flows into each of the comb drive capacitors is equal, and the charge that flows out of each of the comb drive capacitors is equal.

Figure 2C:
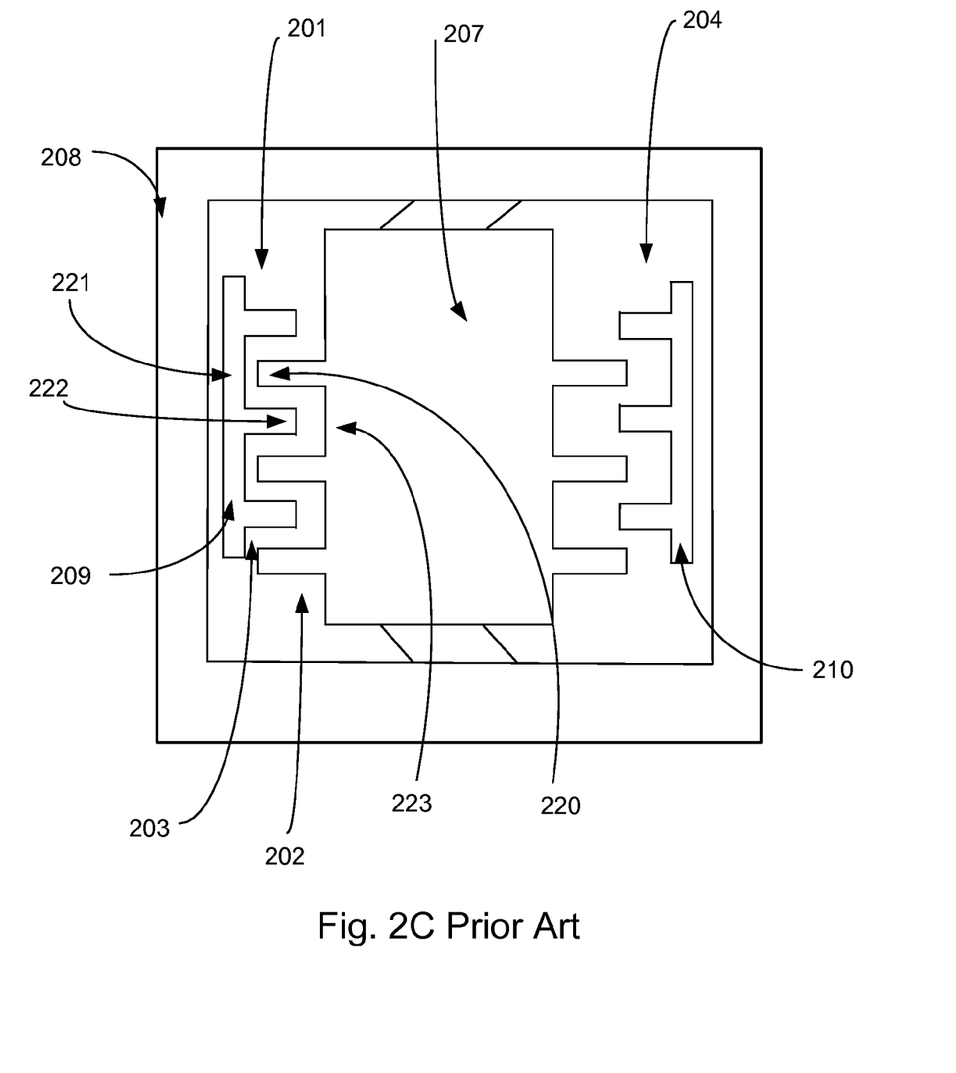
FIG. 2C schematically illustrates the drive combs of a prior art accelerometer wherein the shuttle has been displaced from its nominal position.

In contrast, FIG. 2C schematically illustrates the comb drive capacitors 201 and 204 of a prior art accelerometer wherein the shuttle 207 has been displaced to the left from its nominal position. As shown, the shuttle fingers 202 of comb drive capacitor 201 are more fully engaged with the fixed drive fingers 203 than are their counterparts 205 and 206 in comb drive capacitor 204. Although the comb drive capacitor 201 now has a greater surface area, this does not substantially effect the electrostatic force, since the electrostatic forces between the shuttle fingers and each opposing fixed finger (i.e., where the surfaces of the fixed fingers and shuttle fingers are parallel to each other) are equal and in opposite directions. Further, the driving electrostatic force is not substantially effected because it is, in substantial part, a function of the surface area presented by the tips of the shuttle fingers (for example, tips 220 of shuttle fingers 202) to the opposing surface of the fixed finger mesa (for example, opposing surface 221 of the fixed finger mesa 209), and the tip of the fixed fingers (for example, the tips 222 of the fixed fingers 203) to the opposing surface of the shuttle (for example, the opposing surface 223 of the shuttle 207). Therefore, from a driving force perspective, an off-center shuttle does not substantially effect the performance of the comb drive.

However, the change in the capacitances of the comb drive capacitors 201 and 204 does cause the larger of the two comb drive capacitors to draw a greater quantity of charge when its drive signal is high, and to discharge a greater quantity of charge when its drive signal is low, than it would if the shuttle 207 were centered. The inventors discovered that these differences in charge hold information about the magnitude and direction of the displacement of the shuttle 207. For example, the comb drive capacitor that draws and/or discharges the most charge will be on the side of the frame towards which the displaced shuttle has moved. Accordingly, if the current drawn into and/or discharged out of the one or more of the comb drive capacitors 201 or 204 can be measured, information about the displacement of the shuttle can be determined.

Figure 3A:
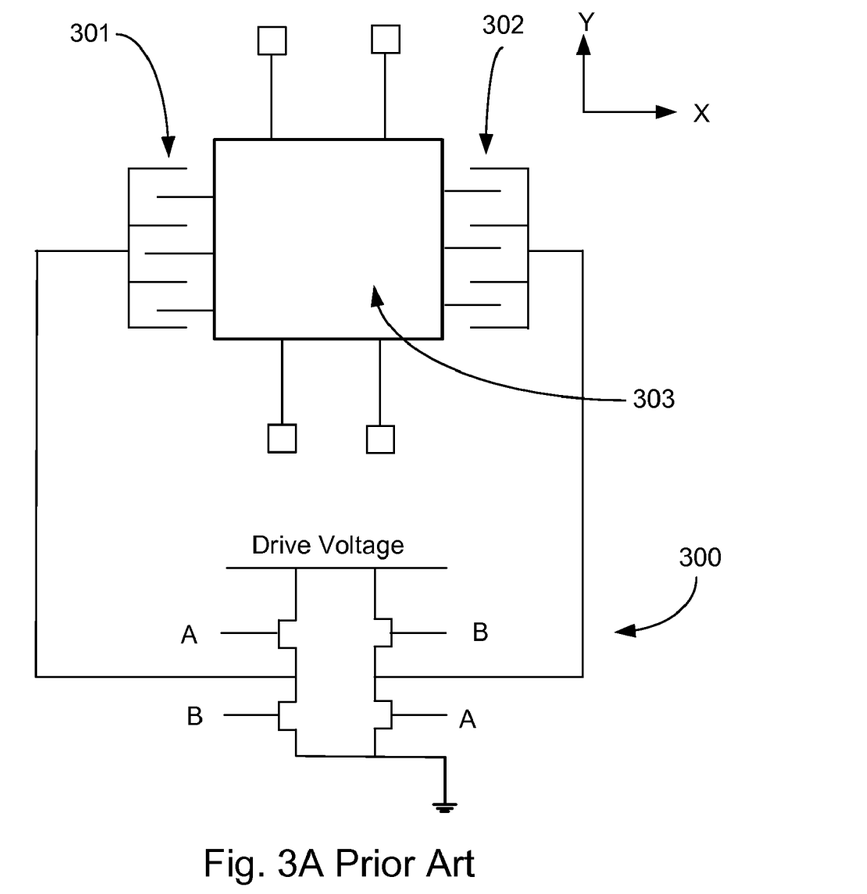
FIG. 3A schematically illustrates a prior art driver circuit for a MEMS multisensor.
Figure 3B:
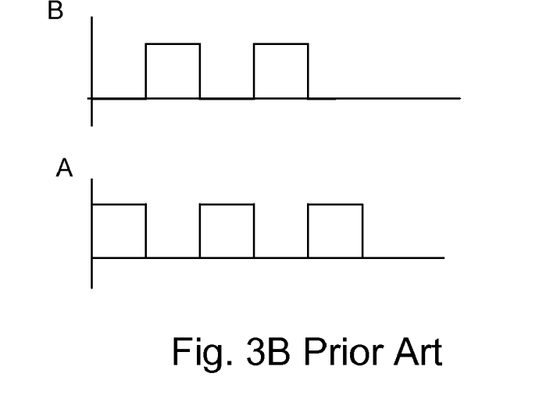
FIG. 3B shows an illustrative timing diagram for operating the transistors or switches of the drive circuit of FIG. 3A.

A prior art driver circuit 300 for the accelerometer of FIG. 2A is schematically shown in FIG. 3. As the drive signals of FIG. 3B rise and fall, each of the comb drive capacitors 301 and 302 are alternately coupled to a drive voltage, and ground. If the shuttle 303 is grounded, the electrostatic force imposed by the voltage difference between the shuttle fingers and the fixed fingers that are coupled to the drive voltage will pull the shuttle 303 in the direction of those fixed fingers. As the drive signals alternate, the shuttle 303 will be subjected to alternating electrostatic forces and will therefore vibrate back and forth around the nominal center point of the shuttle.

When a set of fixed fingers is connected to the drive (or "high") voltage, the comb drive capacitor of which those fixed fingers are a part will be charged to the drive voltage. This results in a certain amount of charge on that comb drive capacitor. However, in the alternate phase, those same fixed fingers are coupled to ground, and that charge will drain from that comb drive capacitor directly to ground, with the resulting loss of any information inherent in the charge.

Figure 4A:
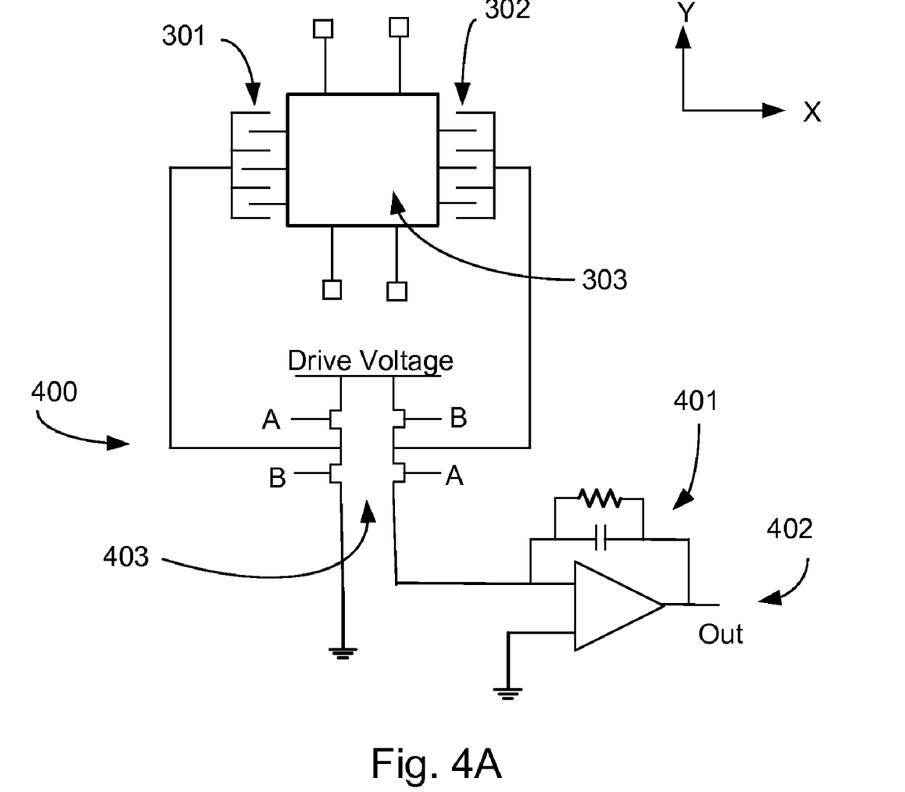
FIG. 4A schematically illustrates a circuit for sensing linear acceleration from one comb drive capacitor of a multisensor accelerometer according to an illustrative embodiment of the invention.
Figure 4B:
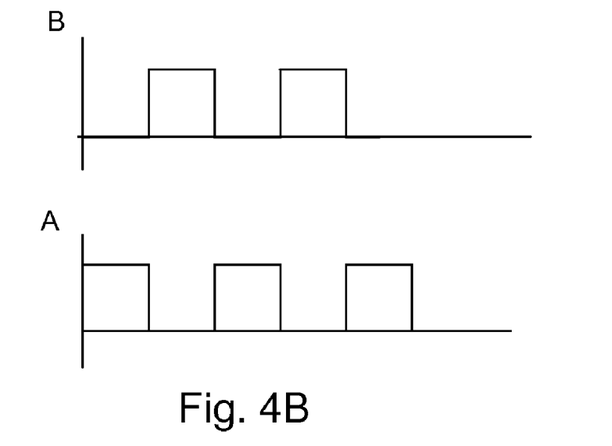
FIG. 4B shows an illustrative timing diagram for operating the transistors or switches of the drive circuit of FIG. 4A.

One embodiment of the present invention uses a circuit for sensing the displacement of the shuttle 303 by measuring the discharge of the drive comb capacitor 302 (schematically illustrated in FIG. 4A). In connection with FIG. 4A, FIG. 4B illustrates one embodiment of the timing of control signals A and B that may be used to drive the switches or transistors of FIG. 4A. The drive signals may be, but need not be, the complement of each other.

In contrast to the circuit 300 of FIG. 3A, the circuit 400 of FIG. 4A does not pass the discharge current from the comb drive capacitor 302 to ground. Rather, through the operation of switching circuit 403, the circuit 400 couples the discharge current from the comb drive capacitor 302 to the input of integrator 401. Various alternate embodiments of the switching circuit 403, and the integrator 401, are described in more detail, below.

Figure 4C:
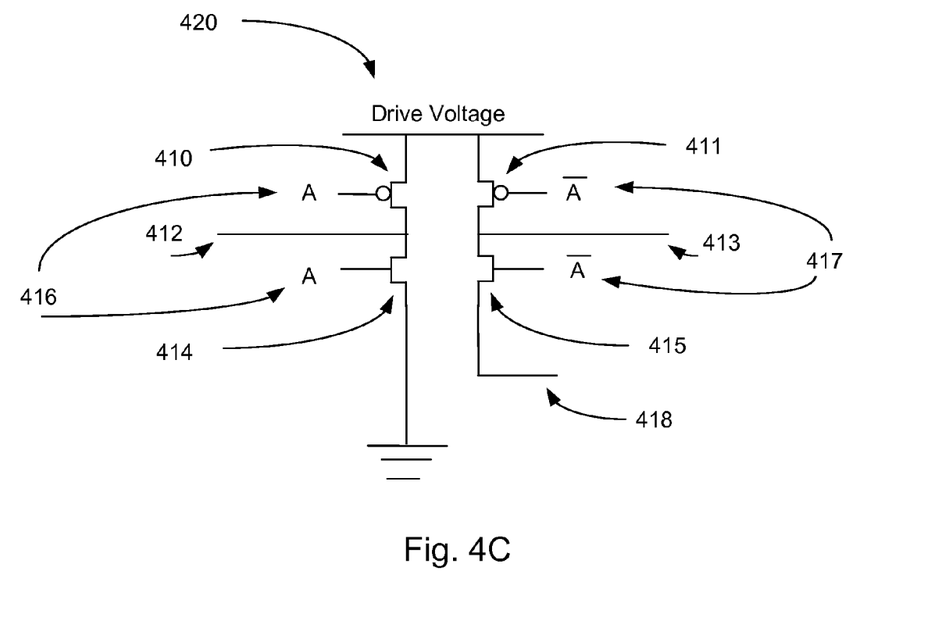
FIG. 4C schematically illustrates an embodiment of a switching circuit.
Figure 4D:
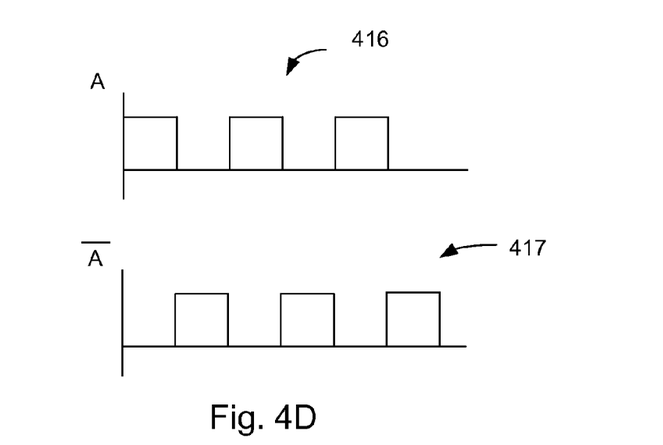
FIG. 4D shows an illustrative timing diagram for operating the transistors of the drive circuit of FIG. 4C.

An alternate and preferred embodiment of switching circuit 403 is schematically illustrated in FIG. 4C as circuit 420. The switches in this embodiment of switching circuit 420 are complementary MOSFETs. The use of these complementary MOSFETs allows the switching circuit 420 to be controlled by one signal ("A") and it's complement ("Abar"). Examples of the signal A 416 and Abar 417 are illustrated in FIG. 4D.

When the signal A 416 is high, then signal Abar 417 is low. In that state, MOSFETs 411 and 414 are on (conducting), and MOSFETS 410 and 415 are off (non-conducting). As such, the comb drive capacitor (not shown) coupled to conductor 413 will be coupled to the drive voltage, while the comb drive capacitor (not shown) coupled to conductor 412 will be coupled to ground.

Alternately, when the signal A 416 is low, then signal Abar 417 is high. In that state, the MOSFETs 410 and 415 are on (conducting), and the MOSFETs 414 and 411 are off (non-conducting). As such, the comb drive capacitor (not shown) coupled to conductor 412 will be coupled to the drive voltage, while the comb drive capacitor (not shown) coupled to conductor 413 will be coupled to the input to an integrator (not shown) through conductor 418. In this state, the current draining from the comb drive capacitor (not shown) coupled to conductor 413 will be captured by the integrator. This design makes controlling the switching circuit 420 simple because only one timing signal, and its complement, are needed. Embodiments of the present invention are not limited, however, to MOSFETs, or even to transistors as the switching elements. Various devices may be used to perform the switching functions ascribed to the MOSFETs in the foregoing embodiment, and the attributes of the timing signals will be dictated by the choice of switching element.

Figure 4E:
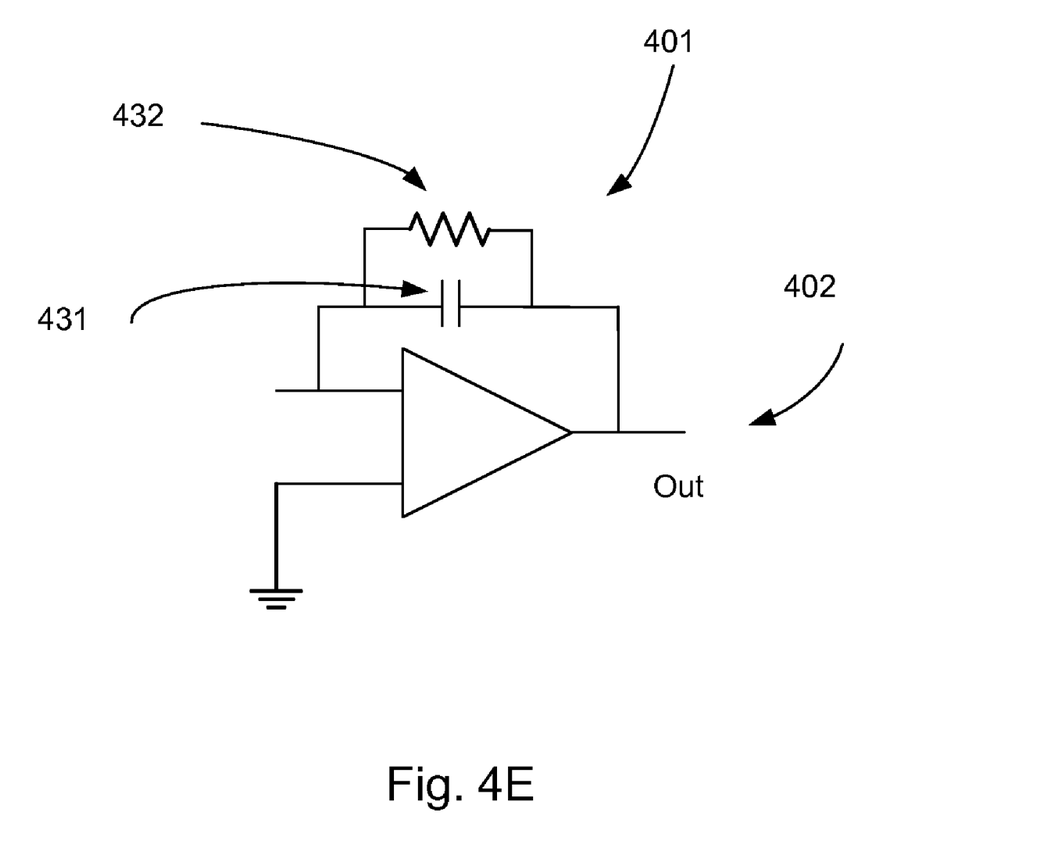
FIG. 4E schematically illustrates an embodiment of an integrator circuit for processing the discharge current from a comb drive capacitor.

The integrator 401 is schematically illustrated in more detail in FIG. 4E, more clearly showing the capacitor 431, and the resistor 432. In operation, current flowing into the integrator 401 will build charge on the capacitor 431, leading to a non-zero output voltage at output 402. If left unchecked, the voltage across the capacitor 431 would build indefinitely (or to the limits of the circuit) when the input is a series of current pulses. However, the resistor 432 provides a path to dissipate the voltage across the capacitor 431. In this way, periodic current pulses (for example, from a comb drive capacitor) are smoothed over time, to present a substantially steady state voltage (although not quite a D.C. voltage) at the output 402. In a given implementation, the resistor 432 and the capacitor 431 will need to be selected to allow the voltage across the capacitor 431 to dissipate at a rate that allows the circuit 401 to reach an equilibrium, without allowing unchecked integration, or rapid dissipation, either of which would prevent the output 402 from reaching a substantially steady state voltage.

In a sense, the integrator 401, as configured in this embodiment, is similar to a low-pass filter. Although this circuit 401 is configured similar to a low-pass filter and has the effect of smoothing periodic current pulses, and does not operate like a classic integrator, it will be referred to herein as an "integrator" in the various illustrations.

The output 402 of the integrator 401 delivers a signal that is proportional to the displacement of the shuttle 303. If the shuttle 303 is not displaced from its nominal centered position, then the charge from the comb drive capacitor will be a nominal amount. However, if the shuttle 303 is displaced (along the X axis) from its nominal centered position, then the charge from the comb drive capacitor 302 will be greater than (or less than, depending on the direction of the displacement) that nominal amount, and its magnitude and polarity will indicate the magnitude and direction of the displacement of the shuttle 303.

The linear acceleration of the multisensor can be determined from the signal output from the output 402 of the integrator 401 because the magnitude and polarity of that signal are functions of the linear acceleration. Specifically, that output signal is a function of the charge on the comb drive capacitor 302. The charge on the comb drive capacitor 302 is, in turn, a function of the displacement of the shuttle 303. The displacement of the shuttle 303 is, in turn, a function of the linear acceleration to which the multisensor is subjected.

The signal output from the output 402 of the integrator 401 may be processed in the analog domain or the digital domain in ways known to those skilled in the art. For example, one approach to determining the linear acceleration acting on the shuttle 303 includes comparing the output of the integrator 401 to a known reference voltage, where the reference voltage is equal to the output of the integrator when the shuttle 303 is not displaced. In one embodiment, this comparison could be performed by coupling the two signals to the two inputs of a difference amplifier (not shown). If the output of the integrator 401 is greater than the reference voltage, that indicates that the shuttle 303 is displaced on one direction, and the magnitude of the voltage difference is proporational to the displacement of the shuttle. Conversely, if the output of the integrator 401 is less than the reference voltage, that indicates that the shuttle 303 is displaced on the opposite direction, and again the magnitude of the voltage difference is proporational to the displacement of the shuttle.

Figure 5A:
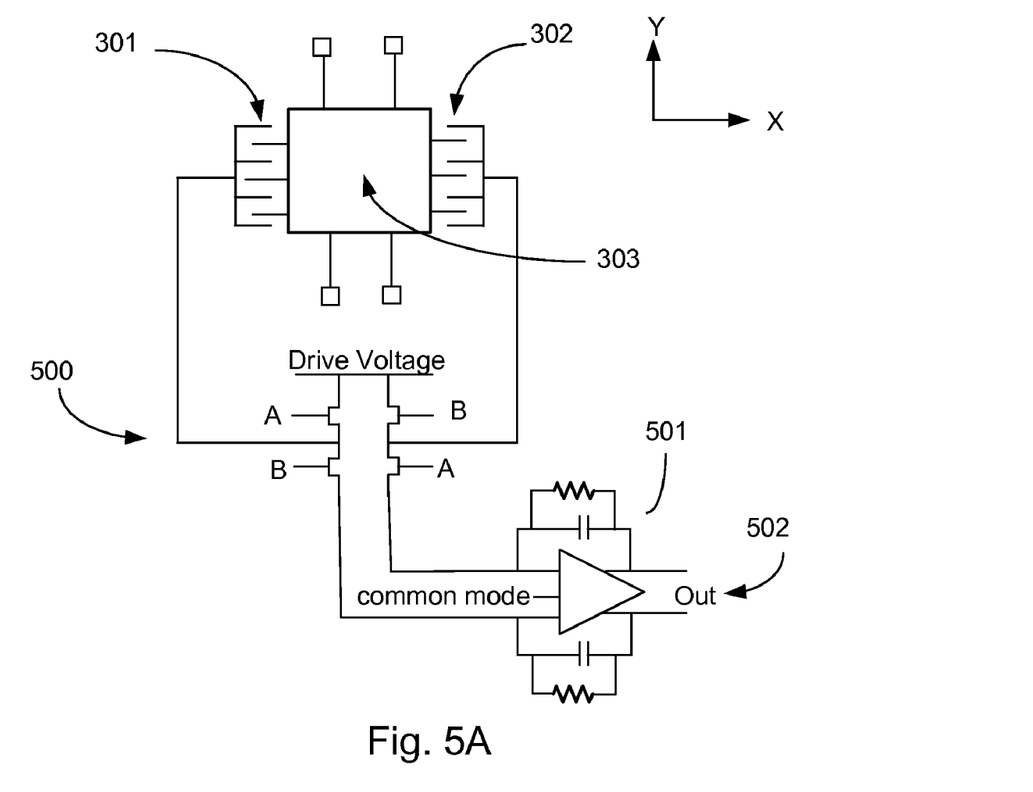
FIG. 5A schematically illustrates a circuit for sensing linear acceleration from two comb drive capacitors of a multisensor according to an illustrative embodiment of the invention.
Figure 5B:
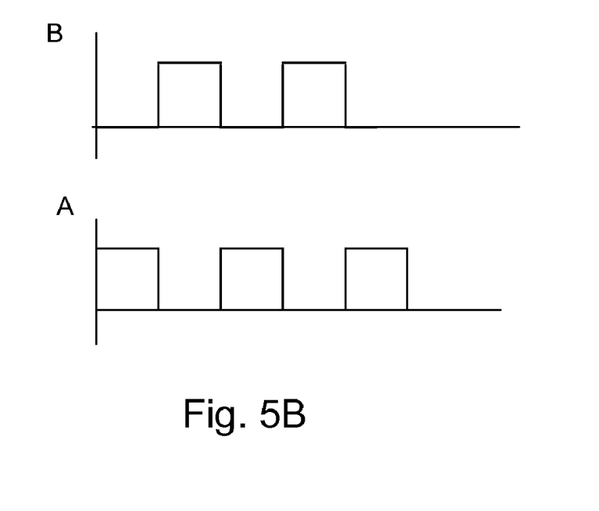
FIG. 5B shows an illustrative timing diagram for operating the transistors or switches of the drive circuit of FIG. 5A.

The embodiment of FIG. 4A monitors a single one of the comb drive capacitors (302). In contrast, FIG. 5A shows another embodiment for sensing the displacement of shuttle 303 by measuring the discharge of two drive comb capacitors. In connection with FIG. 5A, FIG. 5B illustrates an embodiment of the timing of control signals A and B that may be used to drive the switches or transistors of FIG. 5A.

The circuit 500 couples the discharge current from each of the comb drive capacitors to alternate sides of a differential integrator 501. The differential integrator 501 integrates the discharge currents, to produce a signal at the output 502 proportional to the displacement of the shuttle 303. If the shuttle 303 is not displaced from its nominal centered position (along the X axis), then both discharge currents will be nominally equal, and the output 502 of the differential integrator 501 will be nominally zero. However, if the shuttle 303 is displaced along the X axis from its nominal centered position, then the two discharge currents will be unequal, so that the output 502 of the differential integrator 501 will be nonzero, and its magnitude and polarity will indicate the magnitude and direction of the displacement of the shuttle 303, without the need for a separate reference voltage. One advantage of this configuration is that it enables the discharge currents to be effectively compared despite their separation in time. The output 502 of the differential integrator 501 can be processed to assess the magnitude and direction of the displacement of the shuttle 303.

Figure 5C:
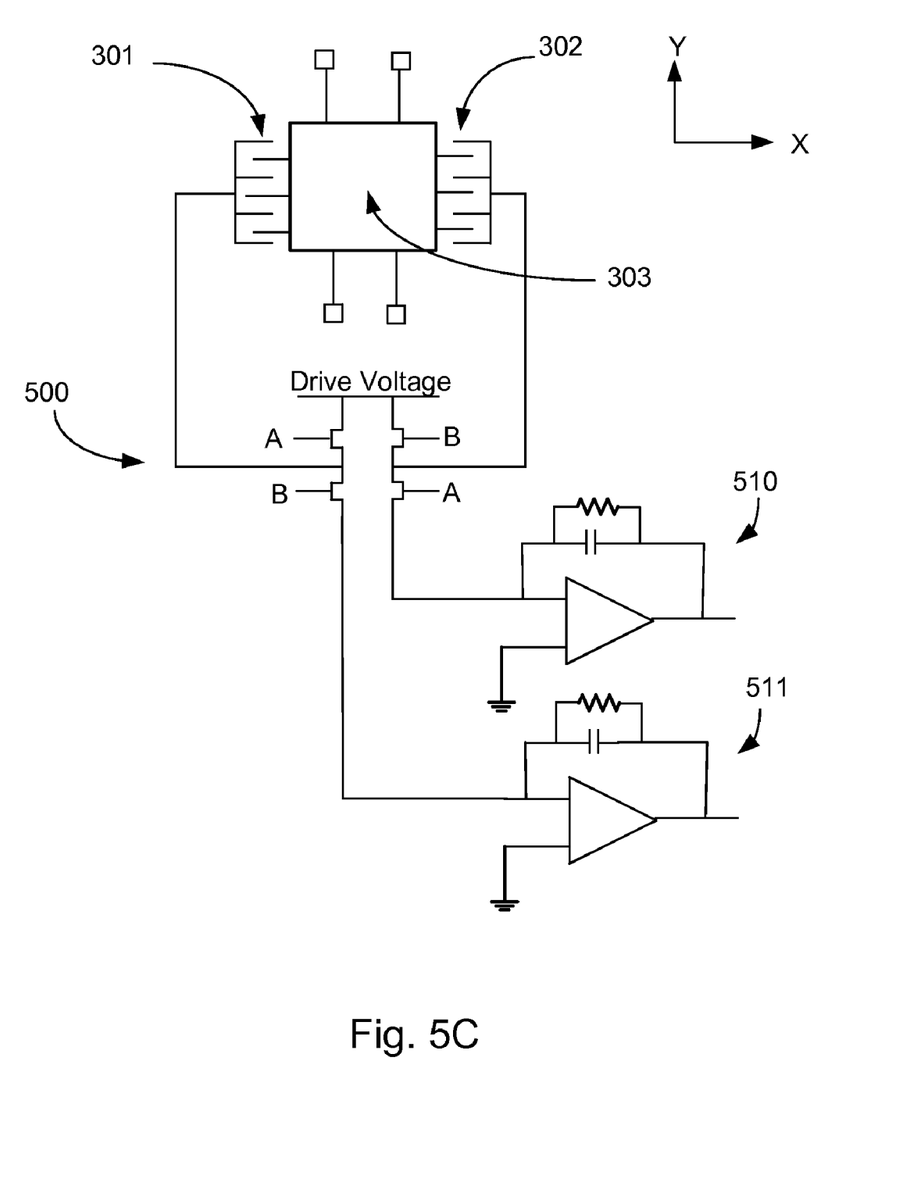
FIG. 5C schematically illustrates a circuit for sensing linear acceleration from two comb drive capacitors of a multisensor according to an illustrative embodiment of the invention.

In an alternate embodiment, a pair of single-ended integrators 510 and 511 could be used in place of differential integrator 501, as illustrated in FIG. 5C. The outputs of the integrators 510 and 511 can be processed to assess the magnitude and direction of the displacement of the shuttle 303.

Figure 6A:
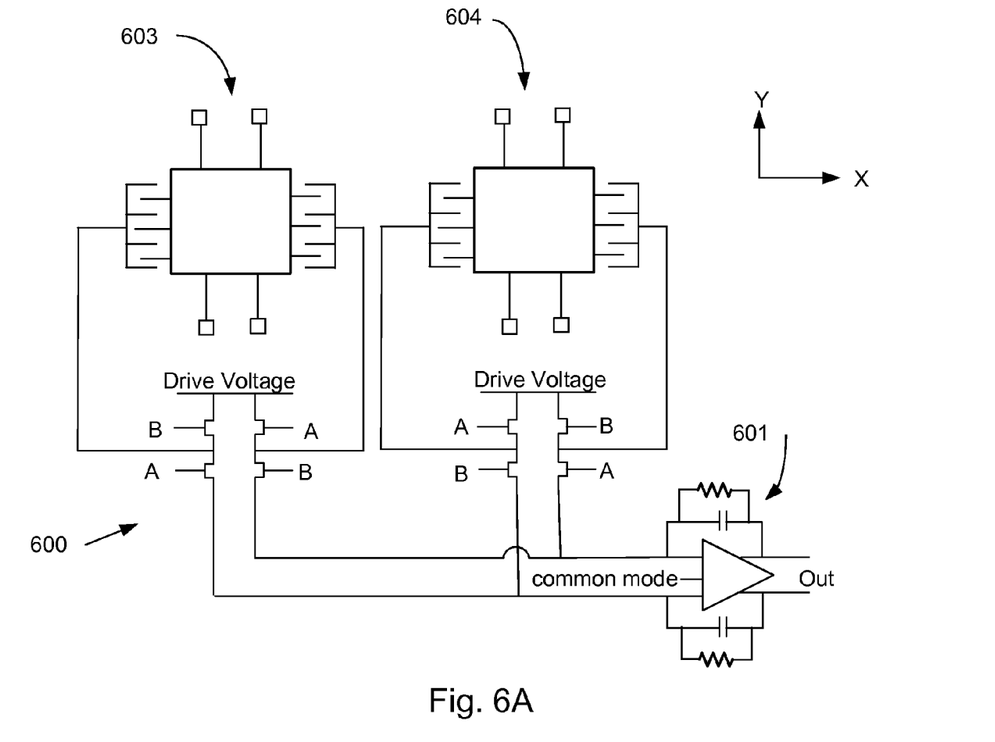
FIG. 6A schematically illustrates a circuit for sensing linear acceleration from the drive combs of two multisensors according to an illustrative embodiment of the invention.
Figure 6B:
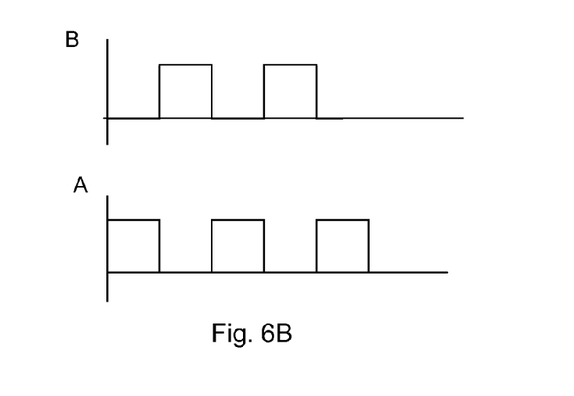
FIG. 6B shows an illustrative timing diagram for operating the transistors or switches of the drive circuit of FIG. 6A.

Because some MEMS sensors use multiple shuttles vibrating in antiphase, some embodiments of the present invention integrate the discharge currents from multiple comb drive capacitors from multiple shuttles. One embodiment of a such a circuit is illustrated by the circuit 600 in FIG. 6A. In connection with FIG. 6A, FIG. 6B illustrates an embodiment of the timing of control signals A and B that may be used to drive the switches or transistors of FIG. 6A. The circuit 600 couples both discharging comb drive capacitors from each of sensors 603 and 604 to the differential integrator 601 substantially simultaneously. Among other benefits, this increases the amount of current available to the inputs of the differential integrator 601.

Figure 7:
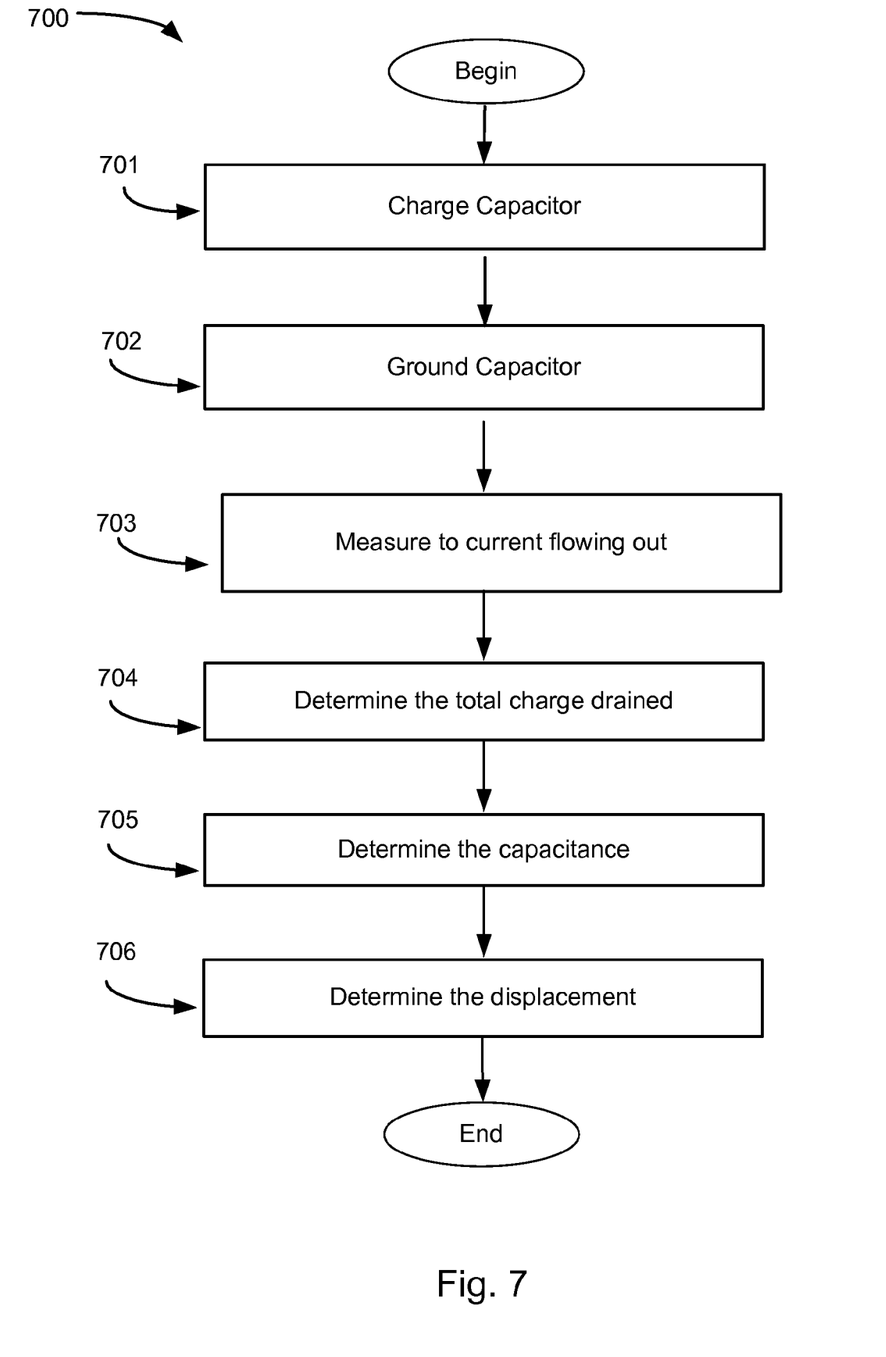
FIG. 7 shows a method for operating a multisensor for determining linear acceleration information by sensing the charge on the drive combs of an accelerometer according to an illustrative embodiment of the invention.

A method of detecting displacement of a MEMS structure having at least one drive capacitor to drive a MEMS shuttle is illustrated in FIG. 7. First, the drive capacitor is charged by coupling one of its electrodes to a known voltage, at step 701. After the capacitor has charged, the same electrode is coupled to ground potential at step 702, allowing the capacitor to discharge. The current flow out of the capacitor is measured at step 703 to determine how much charge was discharged from the capacitor at step 704. For example, the discharging current may be integrated using the integrators of FIG. 4A, FIG. 5A or FIG. 5C. When the charge is known, the capacitance may be determined via the capacitor equation (q=Cv) at step 705, since the charging voltage is also known. Because the capacitance of the capacitor changes with displacement of the MEMS shuttle, the displacement of the shuttle can be determined at step 706 from the calculated capacitance. Therefore, measuring the capacitance of the capacitor yields information about the magnitude and direction of the displacement of the MEMS shuttle. As discussed above, the displacement of the MEMS shuttle, in turn, yields information about the linear acceleration acting on the shuttle along the sensitive axis (in the foregoing illustrations, the X axis).

Although the above discussion discloses various exemplary embodiments of the invention, it should be apparent that those skilled in the art can make various modifications that will achieve some of the advantages of the invention without departing from the true scope of the invention.

What is claimed is:

1. A method of detecting displacement of a MEMS structure, the method including:
   providing at least one drive capacitor for electrostatically driving the MEMS structure, wherein the capacitance of the at least one drive capacitor varies as a function of the displacement of the MEMS structure;
   charging the at least one drive capacitor;
   measuring the electrical charge on the at least one drive capacitor; and
   determining the displacement of the MEMS structure as a function of the electrical charge measured on the at least one drive capacitor.

2. The method of claim 1 further comprising charging the at least one drive capacitor with a drive voltage.

3. The method of claim 1 further comprising charging the at least one drive capacitor with a periodic alternating voltage.

4. The method of claim 3 wherein the periodic alternating voltage alternately charges and discharges the at least one drive capacitor.

5. The method of claim 3 wherein measuring the electrical charge on the at least one drive capacitor comprises measuring the charge discharged by the at least one drive capacitor during a discharge cycle of the periodic alternating voltage.

6. The method of claim 1 wherein measuring the electrical charge on the at least one drive capacitor comprises integrating the current discharged by the at least one drive capacitor.

7. The method of claim 1 wherein the MEMS structure comprises a shuttle of a gyroscope.

8. The method of claim 7 wherein the MEMS structure comprises one of two shuttles oscillating in antiphase.

9. The method of claim 1 further comprising
   providing a second drive capacitor for electrostatically driving the MEMS structure;
   alternately charging and discharging the first and second drive capacitors; and
   measuring the electrical charge from the drive capacitor being discharged.

10. The method of claim 9 wherein measuring the charge comprises coupling the drive capacitor to an integrator.

11. A method of detecting the in-phase displacement of two MEMS structures oscillating in antiphase, the method including:
    providing a first MEMS structure having a first drive capacitor and an opposing second drive capacitor;
    providing a second MEMS structure having a third drive capacitor and an opposing fourth drive capacitor;
    driving the first drive capacitor and the third drive capacitor with a first periodic drive signal having a high phase and a low phase;
    driving the second drive capacitor and the fourth drive capacitor with a second periodic drive signal having a high phase and a low phase, where the second periodic signal is the inverse of the first periodic signal; and
    measuring the discharge current from the first drive capacitor and the third drive capacitor during the low phase of the first drive signal.

12. The method of claim 11, wherein the method further comprises:
    measuring the discharge current from the second drive capacitor and the fourth drive capacitor during the low phase of the second drive signal.

13. The method of claim 11 wherein measuring the discharge current from the first drive capacitor and the third drive capacitor comprises operably coupling the discharge current of the first drive capacitor and third drive capacitor to a first terminal of a differential integrator.

14. The method of claim 11 wherein measuring the discharge current from the first drive capacitor and the third drive capacitor comprises operably coupling the discharge current of the first drive capacitor and third drive capacitor to the input of a first single-ended integrator.

15. An apparatus for determining acceleration, the apparatus comprising:

a movable mass;

at least one drive capacitor for receiving an electrostatic force and vibrating the movable mass in response to the received electrostatic force; and a measuring circuit operatively coupled with the at least one drive capacitor, the measuring circuit measuring the electrical charge on the at least one drive capacitor and producing a signal representing acceleration as a function of the measured electrical charge.

16. The apparatus as defined by claim 15 further comprising an output for delivering a rotational acceleration signal as a function of the Coriolis responsive movement of the movable mass.

17. The apparatus as defined by claim 15 wherein the measuring circuit measures discharge of charge from the at least one drive capacitor to produce the signal representing acceleration.

18. The apparatus as defined by claim 15 wherein the measuring circuit comprises an integrator to integrate the current discharged from the at least one drive capacitor.

* * * * *